2,765,324

SURFACE ACTIVE POLYCARBAMATES

Warren D. Niederhauser, Huntingdon Valley, Pa., assignor to Rohm & Haas Company, Philadelphia, Pa., a corporation of Delaware No Drawing. Application May 26, 1953,
Serial No. 357,642

14 Claims. (Cl. 260—404.5)

This invention concerns polycarbamates in which hydroxyethyl carbamate groups recur and which contain a hydrophobic group. These compounds may be represented by the structural formula

where R is a hydrocarbon group of at least seven carbon atoms, $R^0$ is a carbohydroalkoxy group of two to three carbon atoms, $x$ is an integer of at least three, and A is an ethylene (—CH$_2$CH$_2$—) group or a propylene group (—CH(CH$_3$)CH$_2$—). This invention also deals with a method for the preparation of these compounds.

These compounds are non-ionic surface-active agents of high foaming power. They are useful as wetting agents, dispersing agents, emulsifiers, and detergents. They are particularly useful as components of cleaning compositions in admixture with alkylaryl sulfonates or alcohol sulfates. They are very effective as anti-static agents on textiles and plastics. They are useful as textile softeners and finishing agents.

These compounds can be prepared by starting with a monocarboxylic acid having a hydrophobic residue, reacting this with a polyalkylenepolyamine to form a polyaminopolyalkylene carboxylic amide, and reacting this amide with ethylene or propylene carbonate.

The reaction of acid and polyalkylenepolyamine is carried out by mixing the two in about equimolecular proportions, desirably in the presence of an organic solvent, and heating the mixture between about 125° and 200° C. until about one molecular proportion of water has been evolved. The preferred range of temperature is from 125° to about 175° C., since in this temperature range cycle formation is essentially avoided.

The polyalkylenepolyaminoamide thus produced is mixed with an ethylene carbonate. At least three moles of such carbonate are needed to ensure water-solubility of the final product and as many moles may be reacted as there are —NH— groups in the amide. In any case sufficient —NH— groups should be reacted to ensure water-solubility. In place of ethylene carbonate itself there may be used propylene carbonate, providing in effect a methylethylene group and giving an N-(2-hydroxy)-propyl substituent in the polycarbamate. This reaction starts usually at a temperature of about 20° C. or less with the temperature of the mixture rising from heat of reaction. An upper temperature of about 100° C. ensures completion of the reaction, although temperatures up to 125° C. may be used.

The first stage of the above process is desirably carried out in the presence of an inert organic solvent, such as xylene or naphtha. When such a system is heated under reflux, water is azeotropically removed. Solvent may then be removed, conveniently under reduced pressure. Solvent is not necessary during the second stage of the process, but may be used if desired.

As starting acids there may be used long chained fatty acids, such as caprylic, capric, undecanoic, lauric, myristic, palmitic, margaric, stearic, arachidic, carnaubic, undecylenic, oleic, erucic, linoleic, or ricinoleic; alkylaryl, such as butylbenzoic, octylbenzoic, or butylnaphthoic; arylaliphatic, such as butylphenylacetic or octylphenoxyacetic; cycloaliphatic, such as octylhexahydrobenzoic, abietic, or various naphthenic acids. Instead of an individual acid there may be used a mixture of acids, such as occur in natural fats and oils, as in coconut oil, animal fat, palm oil, castor oil, linseed oil, etc. or in cuts of naphthenic acids or acids derived from petroleum cuts through oxidation, or tall oil acids.

The monocarboxylic acids may be summarized by the formula RCOOH, where R is a hydrocarbon group of at least seven carbon atoms. R should be of sufficient size to supply the hydrophobic balance required for the polycarbamate groups present in the final product. In general it will have from 7 to 23 carbon atoms.

Instead of the acids themselves there may be used anhydrides, acyl halides, esters of lower alkanols, the carboxylic amides, or ammonium carboxylates.

As polyamines there may be used any of the polyethylenepolyamines having at least three ethylene groups. There is no fixed value for the upper limit of the number of these groups, although because of lack of availability of larger compounds, the practical limit is at about ten. Mixtures of polyethylenepolyamines are quite as desirable as individual polyamines. In place of polyethylenic compounds there may be used 1,2-propylene homologues or polyamines having mixed alkylene groups.

These polyamines may be summarized by the formula NH$_2$(ANH)$_x$H, where A is an alkylene group of two to three carbon atoms with two carbon atoms between nitrogens and $x$ has a value of three to ten.

The proportion of ethylene or propylene carbonate to be used will be sufficient to ensure water-solubility of the final product. This requires from about three moles of said carbonate up to a number of moles equal to the number of amino groups in the polyaminoamide with which the alkylene carbonate is reacted.

While the chief product may be represented as

it is probable that some of the product may exist in a glyoxalidine form, thus

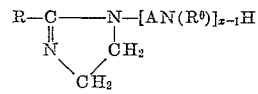

Also, in large molecular polyalkylenepolyamines there may be a small amount of more complex molecules, since there is evidence of some tertiary nitrogen in these.

Additional details of typical preparations are given in the following illustrative examples. Parts are by weight.

Example 1

There were mixed 472 parts of tetraethylenepentamine, 500 parts of lauric acid, and 250 parts of xylene. The mixture was heated at reflux temperatures with trapping of the condensate and removal of water. Heating was continued at 145°–166° C. for nine hours. The temperature was lowered to 95° C. and the solvent was removed under reduced pressure. There was thus obtained a residue of 800 parts of a fluid oil, which was insoluble in water and which was chiefly the compound

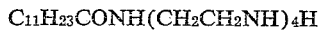

(a) There were mixed 93 parts of this product and 42 parts of ethylene carbonate. An exothermic reaction began and raised the temperature of the mixture about 50° C. The mixture was heated for an hour on the steam bath. The resulting product was an opaque, semi-solid material which was insoluble in water.

(b) There were mixed 93 parts of the above polyaminoamide and 78 parts of ethylene carbonate. The resulting exothermic reaction raised the temperature of the reaction mixture rapidly. The mixture was heated at 90°–100° C. for an hour. There was thus formed a viscous, oily product which was soluble in water. The solutions thereof were highly capillary active. This compound has the probable structure $C_{11}H_{23}CONHCH_2CH_2NH$
[$CH_2CH_2N(CO_2CH_2CH_2OH)$]$_3$H (c) There were mixed 370 parts of the above polyaminoamide and 416 parts of ethylene carbonate. The reaction started promptly. The mixture was heated on a steam bath for three hours. The resulting product was a viscous oil. It was soluble in water. The aqueous solutions thereof were markedly surface active, a 0.1% solution having a surface tension of 24.5 dynes per cm. This compound was found to be bactericidal, having a phenol coefficient of 57 against *Micrococcus pyogenes* var. *aureus* and of 75 against *Salmonella typhosa*. Also, this compound possesses fungicidal properties and acts as a corrosion inhibitor. It is very effective, for example, in dilute hydrochloric acid in limiting attack on ferrous metals.

Ths product corresponds in composition to the formula $C_{11}H_{23}CONH[CH_2CH_2N(COOCH_2CH_2OH)]_4H$

Example 2

There were mixed 123 parts of nonaethylenedecamine, 55.2 parts of lauric acid, and 40 parts of xylene. The mixture was stirred and heated under reflux with removal of water in a trap. Refluxing was continued for 4.5 hours at 145°–148° C. The temperature was lowered to 95° C. and the xylene was removed under reduced pressure. The product was obtained as an oily material which corresponded in composition to the desired polyaminoamide, $RCONH(CH_2CH_2NH)_9H$, where R is the hydrocarbon residue of lauric acid.

(a) There were mixed 59 parts of this product and 62.5 parts of ethylene carbonate. Reaction started promptly with evolution of heat. The mixture was heated at about 100° C. for two hours. There resulted a water-soluble, viscous liquid product, which exhibited capillary activity.

(b) There were mixed 59 parts of the above polyaminoamide and 83 parts of ethylene carbonate. The reaction raised the temperature of the mixture rapidly. It was then heated at 90°–100° C. for about three hours. The product was the desired polyhydroxyethylcarbamate. It was water-soluble and markedly surface active. This compound like the others of this invention is useful as a wetting agent, emulsifier, and foaming agent. It corresponds in composition to $C_{11}H_{23}CONH[CH_2CH_2N(COOCH_2CH_2OH)]_9H$ In the same way propylene carbonate is used as a reactant. The end product is much like that described above. It corresponds in composition to $C_{11}H_{23}CONH[C_2H_4N(COOC_3H_6OH)]_9H$

Example 3

There were mixed 705 parts of oleic acid, 472 parts of tetraethylenepentamine, and 200 parts of xylene. The mixture was heated under reflux with removal of water with the aid of a trap. Heating was continued at 150°–179° C. for six hours. The temperature was then lowered to 95° C. and xylene was removed under reduced pressure. There resulted 1086 parts of an oil which was N-polyethylenepolyaminooleylamide.

(a) There were mixed 45 parts of this amide and 31 parts of ethylene carbonate. Reaction began promptly with the temperature rising. The mixture was held at about 90° C. for three hours. A viscous oily product was obtained. It was soluble in water and effected a considerable lowering of surface tension of its solutions.

(b) There were mixed 45 parts of the above amide and 42 parts of ethylene carbonate. The mixture was held at about 90° C. for three hours, a viscous oily product resulting. It was water-soluble and its solutions had low surface tension. This product corresponds in composition to $C_{17}H_{33}CONH[CH_2CH_2N(COOCH_2CH_2OH)]_4H$

Example 4

There were reacted in the same way as shown above two gram moles of oleic acid and two gram moles of nonaethylenedecamine. There was obtained as a liquid the corresponding polyaminoamide. There were mixed together 67 parts of this amide and 83 parts of ethylene carbonate. The mixture was stirred and heated at about 90° C. for four hours. A viscous liquid product was obtained. It was soluble in water, the solutions thereof being markedly surface active. This product corresponds in composition to $C_{17}H_{33}CONH[CH_2CH_2N(COOCH_2CH_2OH)]_9H$ In the same way there may be prepared amides from other aliphatic monocarboxylic acids and polyethylenepolyamines having at least three ethylene groups. The products from the lowest cut of coconut fatty acids, being principally acids of eight and ten carbon atoms, cause definite lowering of surface tension of their aqueous solutions. In the same way longer chained fatty acids may be used to give capillary active end products. In any of these preparations sufficient carbamate groups are introduced to ensure solubility in water.

Example 5

There were mixed 818 parts of tall oil fatty acids, 472 parts of tetraethylenepentamine, and 250 parts of xylene. The mixture was heated under reflux for eight hours with removal of water. The reaction mixture was stripped of solvent as above. There resulted polyethylenepolyaminoamides. These were reacted with ethylene carbonate by mixing 50 parts of the amides with 42 parts of ethylene carbonate and heating the mixture at 90°–100° C. for four hours. A dark viscous liquid resulted. It was water-soluble and its solutions were surface active.

In place of ethylene carbonate there may be reacted 48 parts of propylene carbonate. The end product is similar to that obtained above.

By reacting a fatty acid or related monocarboxylic acid with a polyalkylenepolyamine having alkylene groups of two to three carbon atoms and having four or more amine groups to form an aminoamide and reacting this with ethylene or propylene carbonate there are formed capillary active compounds which are effective wetting, dispersing, emulsifying, foaming, and cleaning agents which are non-ionic in character. These are useful by themselves or they may be used in conjunction with other synthetic detergents of anionic, cationic, or non-ionic types or in conjunction with builders, sequestering agents, or protective colloids.

I claim:

1. A process for preparing polycarbamates which comprises reacting in about molar proportions between 125° C. and 175° C. with evolution of about one molar proportion of water a monocarboxylic acid of the structure RCOOH, where R is a hydrocarbon group of 7 to 23 carbon atoms, and a polyalkylenepolyamine, $NH_2(ANH)_xH$, where A is an alkylene group of two to three carbon atoms with two carbon atoms between nitrogens and $x$ is an integer from three to ten, whereby a polyaminoamide is formed, and reacting said polyaminoamide with an alkylene carbonate, the alkylene group of which contains two to three carbon atoms, there being reacted three to ten molar proportions of said carbonate, the number of molar proportions of said carbonate being the same as the numerical value of $x$.

2. A process for preparing polycarbamates which comprises reacting in about molar proportions between 125° and about 175° C. with evolution of about one molar proportion of water a monocarboxylic acid of the formula RCOOH, wherein R is a hydrocarbon group of 7 to 23 carbon atoms, and a polyethylenepolyamine, $NH_2(CH_2CH_2NH)_xH$, wherein $x$ is an integer from three to ten, whereby a polyaminoamide is formed, and reacting said polyaminoamide with ethylene carbonate, there being reacted from three moles of said carbonate per mole of polyaminoamide to a number of moles equal to the number of amine groups in said polyaminopolyamide.

3. The process of claim 2 in which the polyethylenepolyamine is tetraethylenepentamine.

4. The process of claim 2 in which the polyethylenepolyamine is nonaethylenedecamine.

5. A process for preparing polycarbamates which comprises reacting in about molar proportions between 125° and about 175° C. with evolution of about one mole of water per mole of reacting materials lauric acid and a polyethylenepolyamine having from three to ten ethylene groups, whereby a polyaminoamide is formed, and reacting said polyaminoamide with ethylene carbonate in a proportion of three moles per mole of polyaminoamide to a number of moles equal to the number of amine groups in said polyaminoamide.

6. A process for preparing polycarbamates which comprises reacting in about molar proportions between 125° and about 175° C. with evolution of about one mole of water per mole of reacting materials oleic acid and a polyethylenepolyamine having from three to ten ethylene groups, whereby a polyaminoamide is formed, and reacting said polyaminoamide with ethylene carbonate in a proportion of three moles per mole of polyaminoamide to a number of moles equal to the number of amine groups in said polyaminoamide.

7. A process for preparing polycarbamates which comprises reacting in about molar proportions between 125° and about 175° C. with evolution of about one mole of water per mole of reacting materials tall oil acids and a polyethylenepolyamine having from three to ten ethylene groups, whereby a polyaminoamide is formed, and reacting said polyaminoamide with ethylene carbonate in a proportion of three moles per mole of polyaminoamide to a number of moles equal to the number of amine groups in said polyaminoamide.

8. Polycarbamates of the general structure

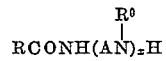

wherein R is a hydrocarbon group of 7 to 23 carbon atoms, A is an alkylene group of two to three carbon atoms having two carbon atoms between nitrogens, $R^o$ is a carbohydroxyalkoxy group having two to three carbon atoms in its alkoxy portion, and $x$ is an integer from three to ten.

9. Polycarbamates of the general structure

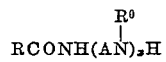

wherein R is an alpihatic hydrocarbong roup of 7 to 23 carbon atoms, A is an alkylene group of two to three carbon atoms having two carbon atoms between nitrogens, $R^o$ is a carbohydroxyalkoxy group having two to three carbon atoms in its alkoxy portion, and $x$ is an integer from three to ten.

10. A compound of claim 9 in which R is in the hydrocarbon residue of lauric acid.

11. A compound of claim 9 in which R is the hydrocarbon residue of oleic acid.

12. A polycarbamate of the general structure

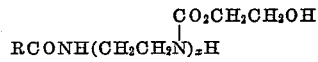

wherein R is an aliphatic hydrocarbon group of 7 to 23 carbon atoms and $x$ is an integer from three to ten.

13. A polycarbamate of the general structure

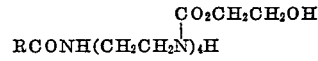

where R is an aliphatic hydrocarbon group of 7 to 23 carbon atoms.

14. A polycarbamate of the general structure

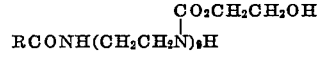

where R is an aliphatic hydrocarbon group of 7 to 23 carbon atoms.

References Cited in the file of this patent

UNITED STATES PATENTS

| | | |
|---|---|---|
| 1,947,951 | Neelmeier et al. | Feb. 20, 1934 |
| 2,041,265 | Orthner et al. | May 19, 1936 |
| 2,627,524 | Malkemus | Feb. 3, 1953 |